Dec. 15, 1936.  B. B. BACHMAN  2,064,100
MOTOR VEHICLE
Filed June 16, 1934     6 Sheets-Sheet 1
Fig.1.
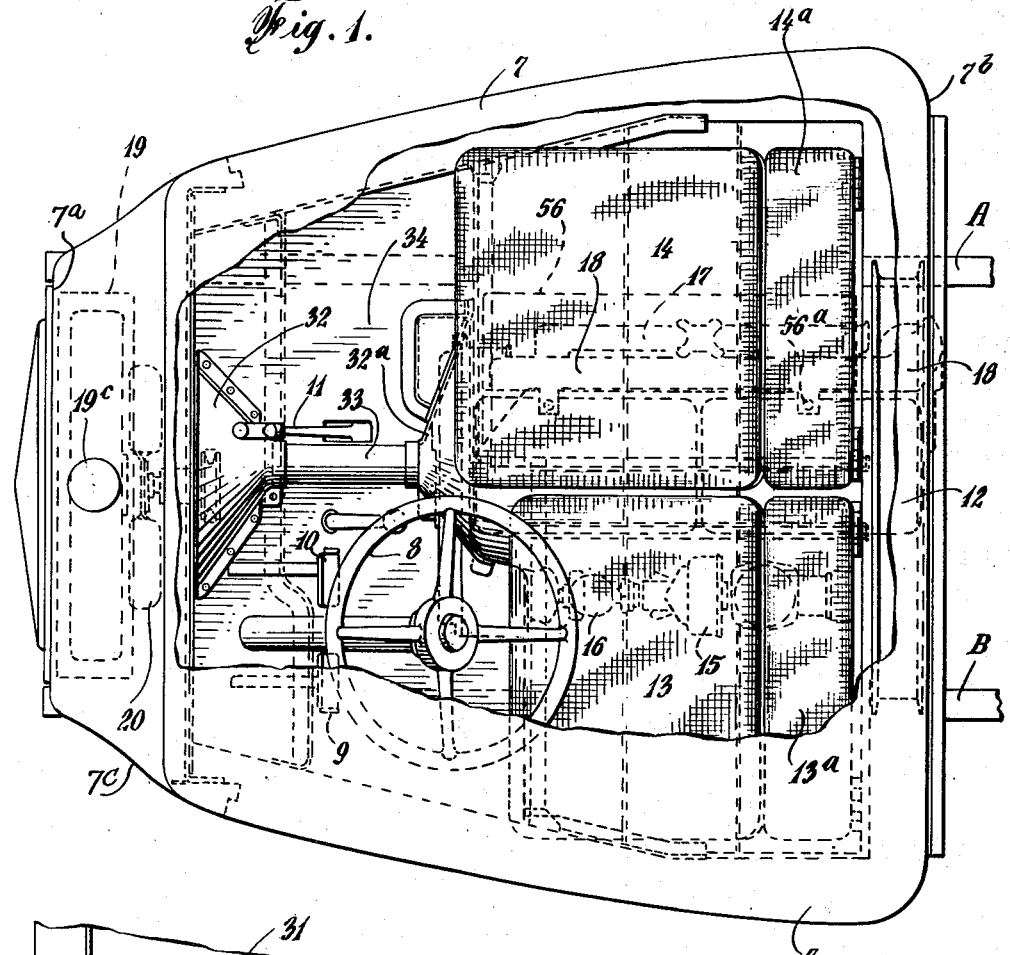
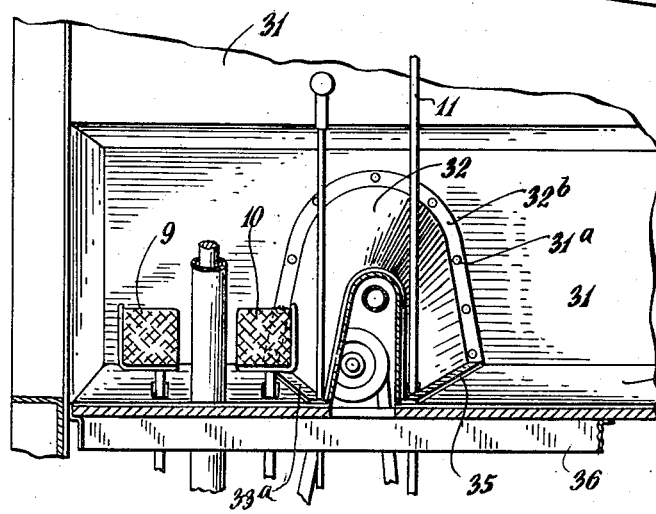
Fig.5.
INVENTOR
Benjamin B. Bachman
BY
ATTORNEY Dec. 15, 1936.  B. B. BACHMAN  2,064,100
MOTOR VEHICLE
Filed June 16, 1934   6 Sheets-Sheet 2
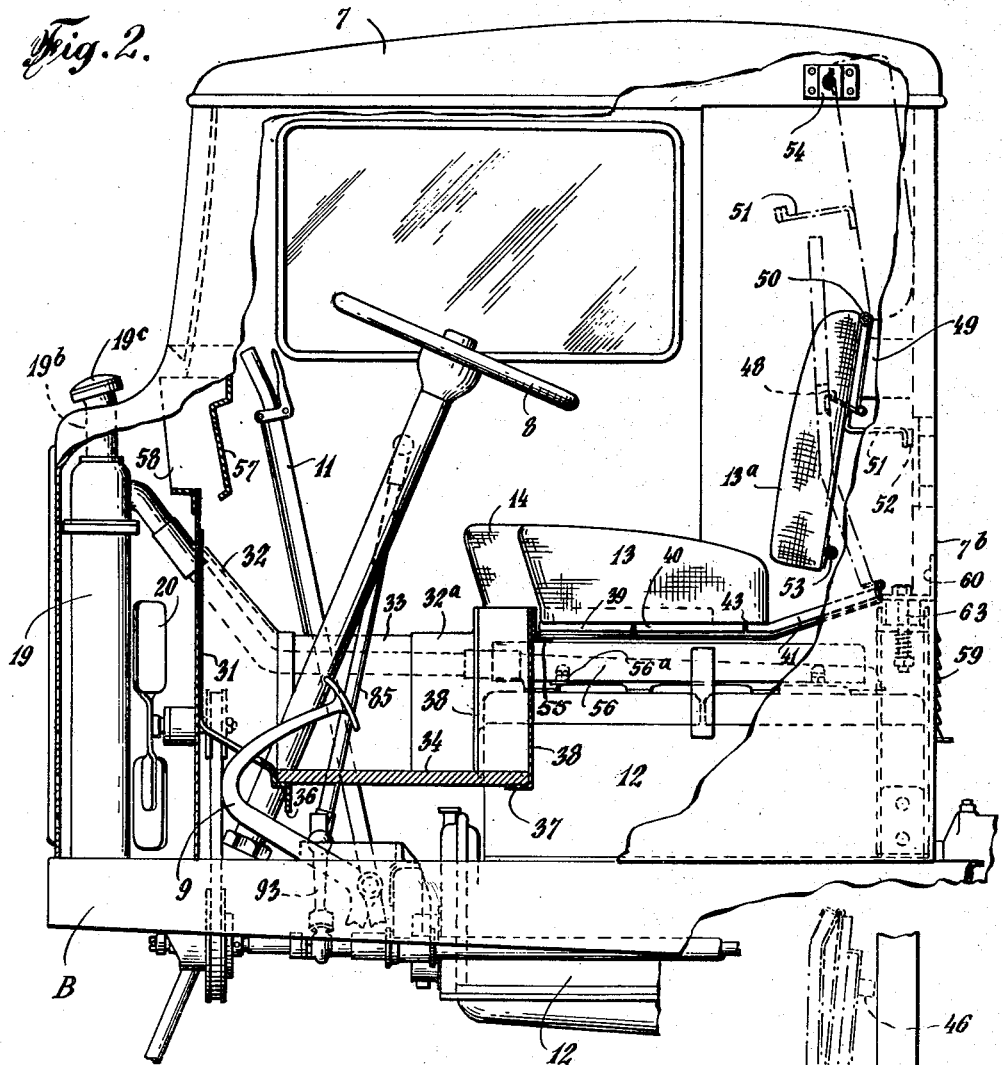
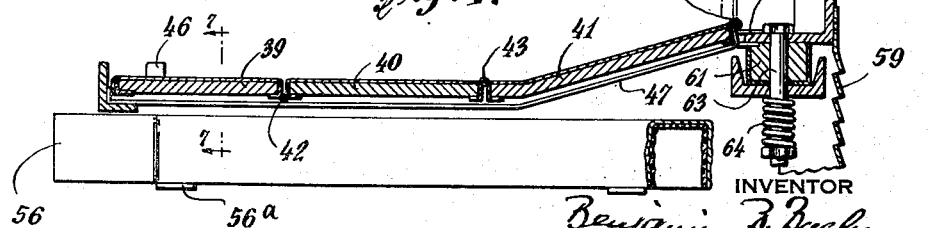

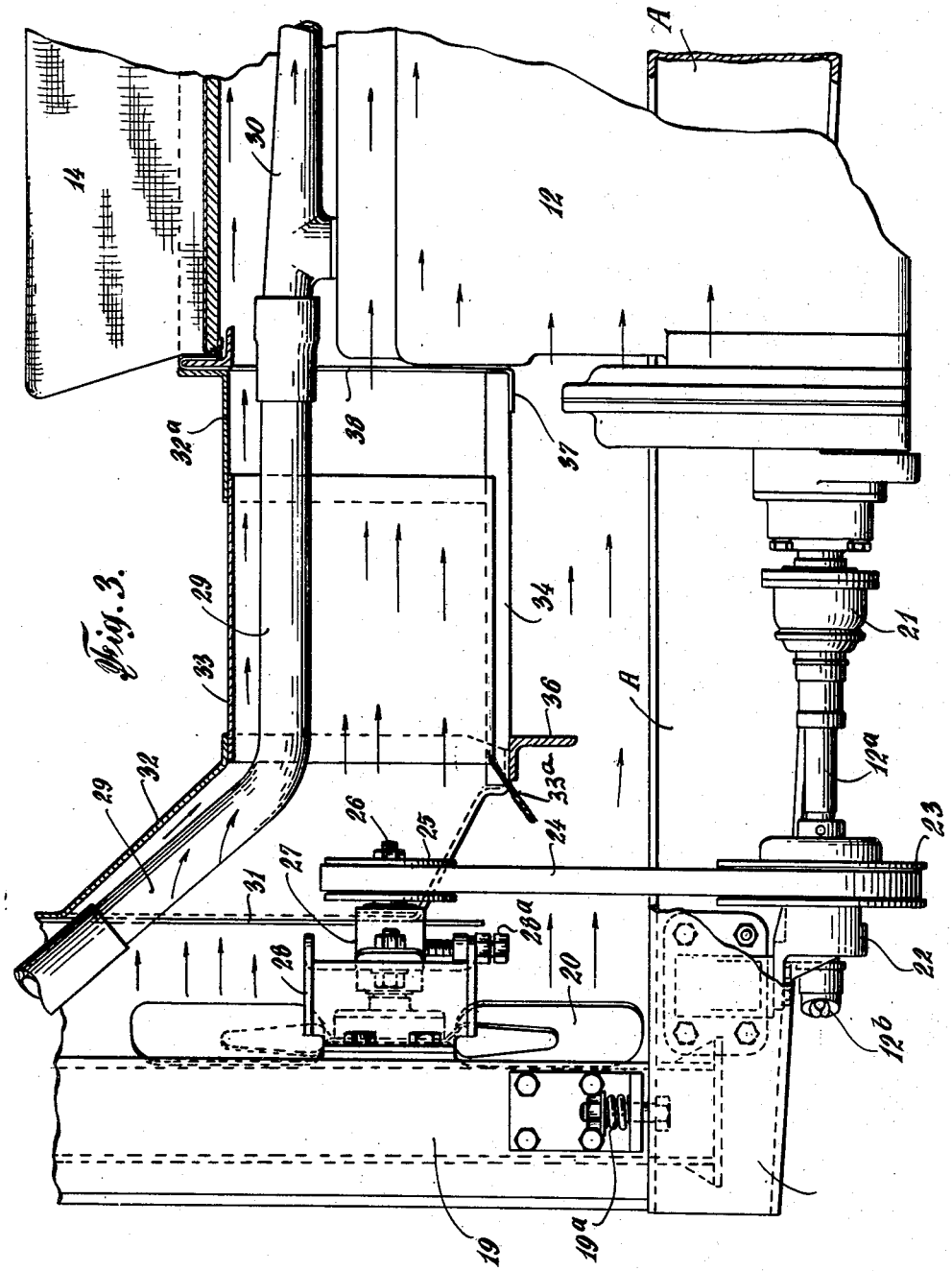

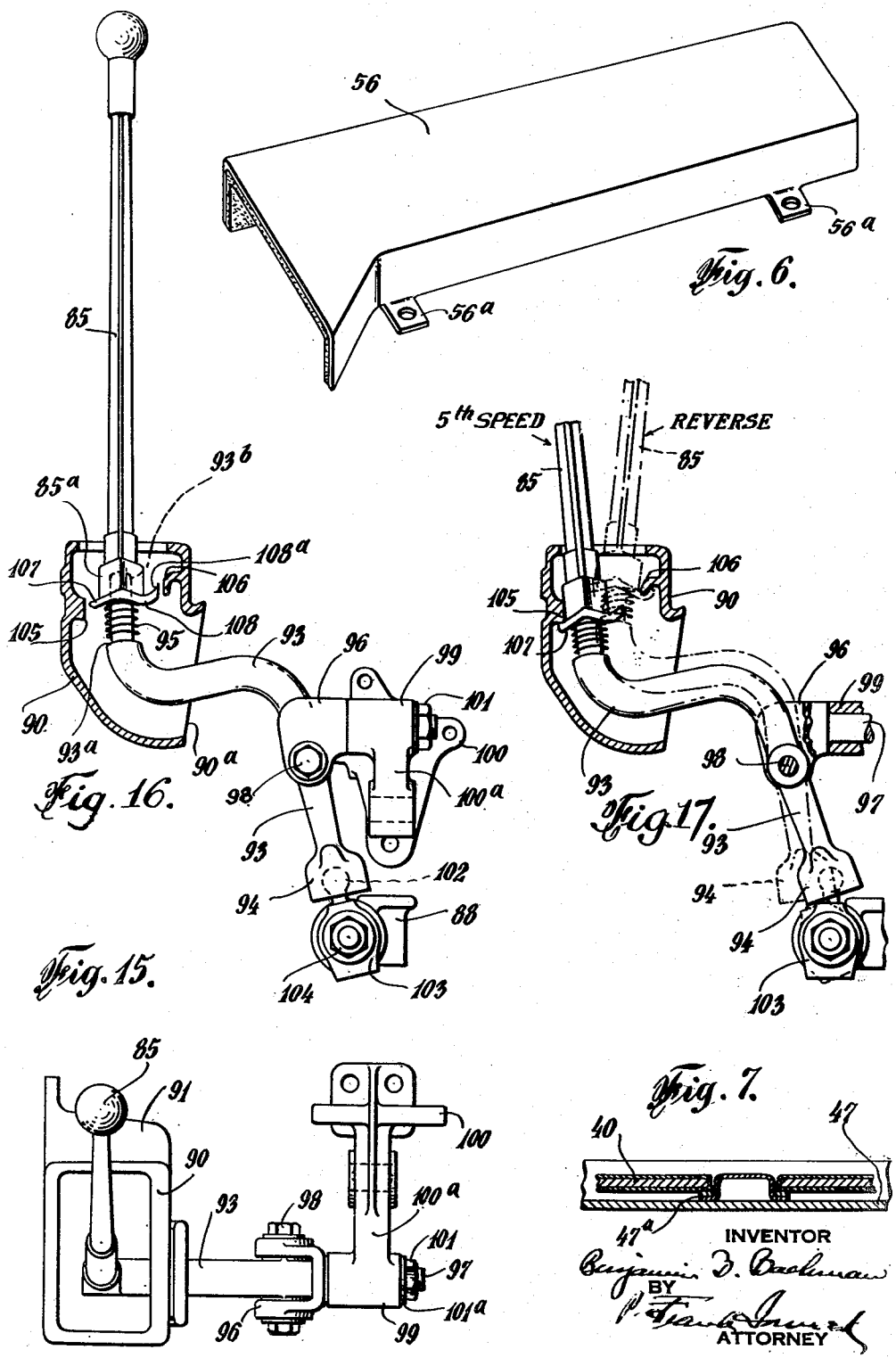

Dec. 15, 1936.  B. B. BACHMAN  2,064,100
MOTOR VEHICLE
Filed June 16, 1934  6 Sheets-Sheet 5
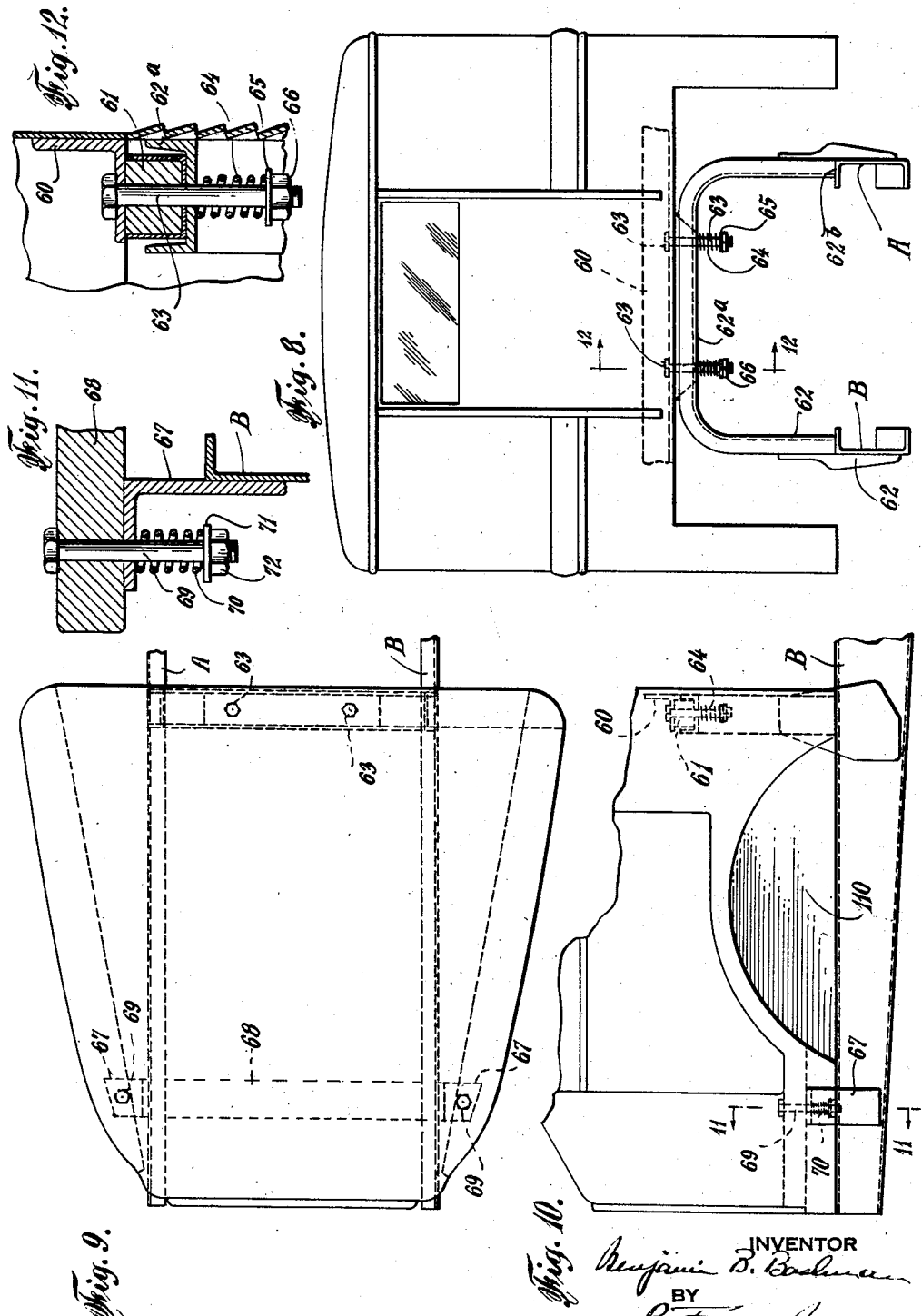

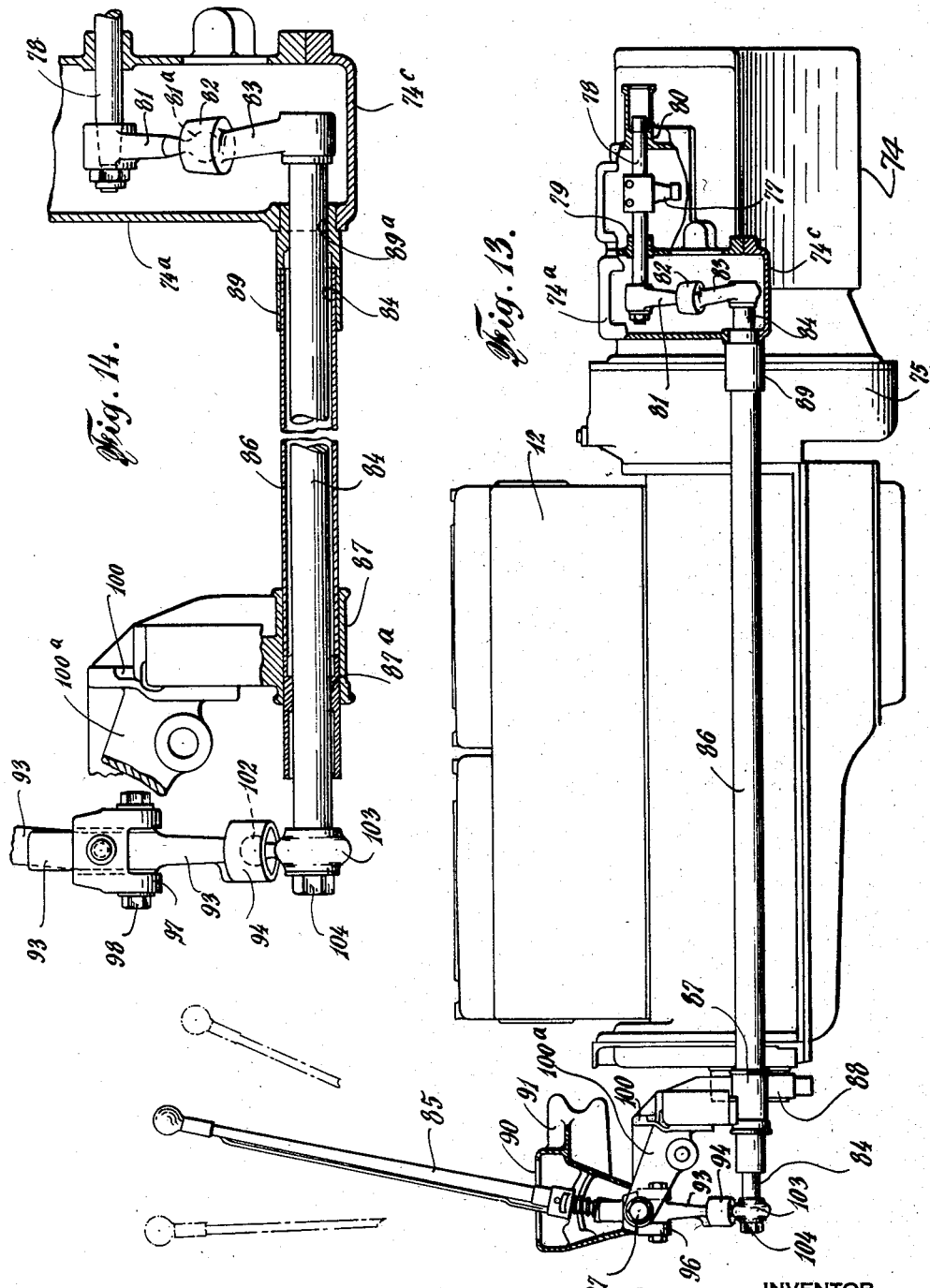

Patented Dec. 15, 1936

2,064,100

UNITED STATES PATENT OFFICE 2,064,100

MOTOR VEHICLE

Benjamin B. Bachman, Philadelphia, Pa., assignor to The Autocar Company, Ardmore, Pa., a corporation of Pennsylvania Application June 16, 1934, Serial No. 730,863

6 Claims. (Cl. 180—54)

The present invention relates generally to the automotive art and is more particularly directed to improvements in so-called motor-vehicles, as those driven by internal combustion engines and designed for operation along the highways and roads in the transportation of passengers, freight and other loads.

While my invention, as will become manifest from the following, may be practiced in the construction and operation of road-vehicles of various types, as trucks, tractors, delivery wagons, omnibusses, passenger and other wheeled conveyances, for the purposes of this disclosure, I have elected to treat it more or less specifically, as it may be employed in conjunction with what are commonly termed heavy-duty trucks and similar vehicles, to which it is especially applicable in obviating certain disadvantages which are inherent to the existing conventional designs of such vehicles, under many conditions of use. It will be understood, however, that this election is made solely for illustrative purposes and is not to be construed, in any sense, as a limitation of the scope of my invention or of its application to this particular type of vehicle.

As is well known, to meet the demand for greater pay-load capacity, the overall length of motor-trucks has been steadily increased, until, in many states and municipalities, regulations and restrictions have been imposed on the operation of vehicles of dimensions in excess of those which may be prescribed as maximum in the regulatory measures. Obviously, in effect, this has served to likewise limit the maximum pay-load capacity of a truck to that which is the product of the extreme dimensions allowed, resulting in an increase in equipment and operating costs, due to the fact that additional vehicles must be employed and serviced, with a concomitant stepping-up of the haulage tariffs, which, of course, is objectionable to and, in many instances, works a hardship upon the consumer who is dependent upon truck transportation for his commodities or other goods. Further, with the trend to greater overall lengths, the problem of maneuverability of the trucks of standard or conventional design, especially in their operation in congested districts and for the performance of loading and unloading operations, has become increasingly difficult to meet, it being evident that a vehicle that slows highway travel because of difficulties in handling, is not only a distinct economic liability to its operator, but constitutes a menace to other traffic. Another difficulty that has confronted the designer and builder of the conventional motor-truck in conforming to the demand for larger pay-load capacities, has been the proper distribution of the axle-load, to insure better riding qualities and reduce tire wear, the reduction in tire costs, as will be obvious, being an imporatnt factor in determining the ultimate truck design. Again, in the attempts to keep pace with the requirements for increased pay-load space, in the conventional design of truck, insufficient consideration has been given to the comfort of the driver or crew and to the improvement of the accessibility of the engine, especially for the purpose of making road-side repairs and adjustments, and the protection of the driver or mechanic while doing such work, it being evident that the provision of better accommodations for the crew will make for safer operation, while the facilitating of the engine repairs and adjustments will contribute materially to the reduction of maintenance costs.

From the foregoing, it will be noted that, while trucks conforming generally to the standard design, that is, with the engine located in advance of the dashboard or front end of the cab or driver's compartment, may be satisfactorily used under certain service conditions, they do not respond to the requirements of general operation. In other words, while a truck of a given wheelbase and overall length may operate in one state, it is precluded from crossing the boundary line into an adjacent state. Similarly, one that may satisfactorily meet the needs of long distance and express highway operation, may be entirely unsuitable for work in congested territories, or in so-called door-to-door service, where frequent loading and unloading are required, with the resultant loss of time, due to the difficulty in handling or maneuvering.

Therefore, the primary object of this invention is to provide a means and method of overcoming the limitations of existing designs of various types of vehicles for the transportation of passengers and other loads, and especially of motor-trucks, as pointed out, in a simple, economical and extremely practical manner, whereby a vehicle may be produced that will adequately respond to the aforesaid diversified requirements that must be met in haulage services, in order to obtain a maximum range of utility per unit at a minimum of outlay for equipment and low maintenance costs.

It is also an important object of my invention to provide for materially increasing the pay-load capacity of a vehicle, as a truck, without proportionately adding to the overall length or wheel-base thereof, as in the production of trucks conforming to the conventional design, thereby making it possible to meet the demand for greater load capacities than are now available and still retain the overall dimensions of the vehicles well within the maximum length limits, as fixed by various states and other political subdivisions of the country.

Another object of this invention is to obtain better maneuverability and greater ease in handling of trucks and similar vehicles of large load capacities, in traversing the highways and especially in executing movements essential to loading and unloading operations, the means which I utilize to this end materially reducing the turning radius of a vehicle of a given load capacity, as compared to one of the same capacity and of the overall length that such capacity requires in the conventional truck design, thus making a vehicle embodying my invention particularly advantageous for use in constricted areas, as in road-building and excavating work.

A further object of my invention is to obtain a more equal distribution of the load upon the axles than it is possible to procure with preceding truck designs, wherein, due to the required placement of the front axles, approximately 75% of the load is imposed upon the rear axle. This not only enhances the durability of the structure as a whole, in resisting detrimental forces, especially those emanating from road shocks, and coincidentally improves the riding qualities, as compared to a vehicle of a like load capacity conforming to the conventional design, but, at the same time, appreciably lessens tire wear, with the decrease in maintenance costs that flows therefrom.

My invention also contemplates a vehicle embodying means whereby shocks that may be transmitted to a cab or driving compartment will be dissipated within the structure itself, thereby greatly promoting the comfort of the driver or operating crew, in which the engine is more accessible, than in a vehicle of the standard design, for making adjustments and repairs, which, as will be evident, is especially advantageous where the work must be done at the road-side, and wherein the crew members or mechanics engaged in such work are afforded protection against the weather and the hazard of injury by passing vehicles.

Other objects and advantages flowing from the practicing of my invention will doubtless become apparent as the description proceeds and I would have it clearly understood that I reserve unto myself all rights to the full range of equivalents, both in structure and in use, to which I may be entitled, under my invention in its broadest aspect.

In the accompanying drawings, I have illustrated a preferred form of my invention, as it may be embodied in truck design, for attaining the aforementioned objectives. It may be pointed out, however, that my invention may take other forms and that it may be utilized in the construction of vehicles of other types, with the same advantages that follow from its application in truck construction.

In the drawings:

Figure 1 is a top plan view of the front end of a truck embodying my invention, with the roof of the cab broken away in part, to disclose the interior thereof.

Figure 2 is a side elevation of the structure shown in Figure 1.

Figure 3 is an enlarged sectional elevation of the lower part of the structure of the preceding figure.

Figure 4 is a sectional elevation of a portion of the cab, showing the seat-supporting components in greater detail.

Figure 5 is a view in elevation of the lower part of the front end of the cab or driving compartment.

Figure 6 is a view in perspective of the pan or cover that is associated with the engine.

Figure 7 is a transverse section on line 7—6 of Figure 4 of a fragment of the cooperating seat-supporting media.

Figure 8 is a rear elevation of the cab, showing the suspension means that I employ in mounting it on the supporting frame member.

Figure 9 is a top plan view of the structure of Figure 8.

Figure 10 is a side elevation of a fragment of the cab structure, illustrative of the relative disposition of the fore and aft mountings.

Figures 11 and 12 are respectively enlarged sectional details of the cab suspension means.

Figure 13 is a side elevation of the engine with associated transmission or gear-set and the means remote therefrom that I employ for performing gear shifting operations.

Figure 14 is an enlarged longitudinal section of interconnected parts of the gear-set operating mechanism.

Figure 15 is a top plan view of the shifting lever and connections to the rockable and slidable shaft, which functions to transmit movements to the gear shifting elements of the gear-set, and Figures 16 and 17 are sectional elevations, respectively, of the structure of Figure 15, illustrative of the mode of operation of the gear shifting lever and of the connections between the lever and the aforesaid shaft, whereby the latter may be actuated in the several gear changing operations.

Referring now to the drawings in detail, in which like characters of reference are employed to designate similar parts in the several views, 7 indicates the cab, conforming generally to the conventional design, 8 the steering wheel, 9 and 10 the clutch and brake actuating pedals, respectively, and 11 the usual hand braking lever.

The power plant, comprising the internal combination engine 12, and its accessories, as will be observed, is located beneath the seats 13 and 14, which, in the present showing, are of the individual type, the accessories, including the pump 15 and the generator 16 being mounted to the left of the engine and driven from the front end thereof by any appropriate means (not shown), while the intake and exhaust manifolds 17 and 18 are supported from the right side of the engine block.

Mounted upon the chassis frame members A and B and cushioned by springs, as at 19a, within the head end 7a of the cab, is the usual radiator 19, having a filling neck 19b extending through the fairing or cowling defining the nose of the cab, which is provided with a suitable cap 19c, a fan 20 being supported behind the radiator for functioning in the operation of the cooling system in the ordinary manner. This fan, as will be clearly seen from Figure 3, is driven from the front end of the engine, by an extension 12a of the engine crank-shaft, including a universal joint 21, which is journaled in a forward bearing 22, fixed to the chassis frame, and carries a pulley 23 to receive the belt 24 passing to the pulley 25 on the fan shaft 26, rotatable in the bearing 27; the latter being adjustable relatively to its fixed supporting bracket 28, through the medium of the usual adjustment screws 28a. For the reception of the usual hand-crank, the front end of the aforesaid extension 12a is provided with a jaw 12b.

The water return line 29, communicating with the top of the radiator and with the head of the engine block, through the manifold or riser 30, is inclined downwardly from the radiator to extend through the dashboard 31 for horizontal disposition in alinement with the said manifold or riser to which it may be connected by the customary clamps or otherwise, the entire line, between the dashboard and the manifold being contained within a housing having its longitudinal axis on the median line of the cab, which functions as a duct in the distribution of the air currents generated by the rotative movement of the fan, to and about the engine, as hereinafter will become apparent. As will be noted, this duct, as shown, embodies two end-forming sections, 32 and 32a, each of a substantially funnel-like profile, and an intermediate section 33 of a uniform shape throughout its length, the section 32 functioning as the inlet and having its end of greatest cross-sectional area abutting upon the dashboard 31, in registration with a complemental opening therein, while the section 32a is arranged in juxtaposition to the front end of the engine block, to effect the distribution of the air passing through the duct over a wide area, as it issues from the enlarged end thereof. The three sections of the duct may be of sheet metal of the requisite gauge, or they may be castings, the intermediate one, preferably, taking the form of a pipe of an oval or elongated cross-section and being telescoped into the end sections to facilitate the removal of the floor-boards 34, upon which the horizontally disposed base-forming flanges 35 of the end sections of the duct, as herein shown, normally abut within the area of the driving compartment. The intermediate section 33, of course, may take other shapes and may include a deflecting surface 33a at its forward end to cooperate in the formation of the inlet 32; likewise, the design of the end sections 32 and 32a may be varied to meet production or other requirements, and the head end of the former may extend through the dashboard instead of terminating in the mating flange 32b, fixed thereto by the bolts 31a as shown.

The engine 12, as will be observed, is located within the area defined by the wall 38, corresponding generally to the so-called heel-board of the conventional cab design, and the sides and rear end wall 7b of the cab, the seat supporting media overlying the engine, cooperating with the wall 38 and the sides and rear wall of the cab to provide, in effect, an engine compartment, within which the engine is virtually housed. In the present instance, each of the seats 13 and 14 is supported in its functioning position upon a pan comprising a plurality of sections 39, 40 and 41, hinged as at 42 and 43, for relatively opposite movement, the section 41, as will be noted, having a hinge connection 44 with the transverse frame member 45 of the cab structure. This hinge also serves as a mounting for the rear end of the pan support 47 which may comprise laterally spaced ways 47a, as shown in Figure 7, the forward end of said support being adapted to rest upon the ledge provided by the angle piece 55 disposed transversely of the forward end of the seat box.

Associated with each of the seats 13 and 14, are the backs 13a and 14a which are hinged to the cross-piece 49 of the cab structure, as at 50, each carrying spacers or legs 51 of the requisite length and shape to abut upon the cushion or cleat 52 fixed to the rear wall of the cab, and impart to the back, when normally functioning, the desired angle of inclination relative to the seat with which it is mounted to cooperate. Each of the backs is provided with a bolt or latch member 53 adapted to cooperate with the socket-piece 54, fixed to the side wall of the cab, adjacent the top thereof, when the back is rotated on its hinge connection 50 to retain it in its raised position, as shown in dot and dash lines in Figure 2. Obviously, the positions of the latch and socket may be transposed and other means than illustrated may be utilized for obtaining the appropriate angle at which the seat-back may be disposed when normally functioning. Also, the pan support 47 may be connected to a part of the cab structure independently of the aforesaid hinge 44 and may take any other suitable form for performing its intended function.

When it is desired or necessary to service the engine, the seats 13 and 14 are removed from the seat-box and the respective backs latched in their raised positions to afford access to the pan, the parts or sections of which are folded upon themselves for rotative movement on the hinge connection 44 to a substantially vertical position in contact with the cushioning element 46, as a rubber pad or the like, after which the pan support 47 is raised to a substantially upright position for engagement by the hook 48 hinged to the seat-back supporting cross-piece 49, (see Figs. 1 and 2). With the seat-backs and the seat-supporting elements in their described suspended positions, and the removal of the insulating cover 56 for the intake and exhaust manifolds, which is bolted, as at 56a, to the engine block, it will be manifest that all parts of the block will become readily accessible and such work as must be performed will be greatly expedited by the entire absence of the usual obstructions, as fenders, for instance, the mechanic or crew member taking his position immediately beside the engine and within the limits of the cab itself, so that he is not only protected against the weather, but from the hazard of injury by passing vehicles.

The wall 38, portions of which are relatively offset in the planes of the front faces of the seats, as will be seen from Figure 2, embodies a ledge 37 which functions with the transverse member 36 to support the floor-boards 34 along their rear and front edges. The wall 38, which may be faced with insulation, together with the floor-boards 34 and the extension of the latter from the transverse member 36 to the dashboard, as the toe-board, in conjunction with the virtual continuation of the upper end of the dashboard to the cab cowling, behind the instrument panel 57, through the medium of the insulating member 58, effectively protects or insulates the front part of the driving compartment from the entrance of heat emanating forward of the engine and especially from the radiator which, of course, is in closer proximity to the driving compartment than in the conventional design of truck. Similarly, the remainder of the cab is insulated from the engine compartment by the wall 38 and the seat pan and its relatively spaced support, either or both of which may be appropriately insulated, as by sheet asbestos, that portion of the engine which liberates the highest temperatures, the exhaust manifold, being substantially isolated within the heretofore referred to heavily insulated boxlike cover 56, it being evident that the passage of the relatively cool air through the duct for distribution over and about the engine and between the top of the engine block and the seat pan, contributes materially to the maintenance of comfortable conditions within the cab, even at relatively high atmospheric temperatures. Suitable louvres 59, as will be noted, are provided in the rear end wall 7b of the cab in the zone of the engine compartment for the emission of the heated air and gases into the external atmosphere.

The cab, the external lines of which, obviously differ from those of a cab of the conventional design, due to the placement of the radiator 19 contiguous to the dashboard 31 and within the cowl 7c, is symmetrically proportioned and affords more than the usual space for the accommodation of the vehicle crew members, the arrangement of the uprights and cross-members contributing to the attainment of an extremely rigid and durable construction. To further promote the comfort of the cab occupants, and, at the same time, protect the cab structure against detrimental forces that would be otherwise transmitted thereto, through the weaving of the chassis frame members, or as a result of road shocks or jars, the cab is mounted for movement relatively to the vehicle frame, under the control of cushioning devices, whereby dissipation of the detrimental forces is effected. In the present showing, the rear transverse frame member 60 of the cab structure abuts upon a bolster 61, preferably of wood, which is located in the horizontal portion 62a of the inverted U-shaped saddle-forming channel member 62, disposed in a vertical plane and fixed to the longitudinal members A—B of the chassis frame, as at 62b, the superimposed parts 60, 61 and 62a being apertured for the reception of the bolts 63 carrying springs 64 interposed between the web of the saddle portion 62a and the washers 65 and their cooperating nuts 66. The forward end of the cab, likewise, is yieldably suspended from the frame member A and B, suitable angle pieces, forming brackets 67 being secured thereto, as by riveting or welding, to function as seats upon which the front transverse member 68 of the cab frame rests, this latter member and the respective brackets having alined openings to receive the bolts 69 supporting the springs 70 interposed between the web of the brackets and the washers 71, with which the nuts 72 cooperate to retain the springs in compression, similarly to the nuts on the bolts 63. As will be noted, the suspension points of the forward end of the cab are approximately at the sill line thereof and outwardly or beyond the plane of the chassis frame members A and B while those of the rear end are between the longitudinals A and B and an appreciable distance thereabove, as fixed by the height of the aforesaid saddle 62, the contour of which permits the cab to rock laterally under the control of the aforesaid fore and aft cushioning devices. This four-point suspension not only possesses all of the advantages that flow from a typical three-point suspension, due to the relative disposition of the bolts 63 and the provision of the saddle 62, but affords a more substantial and practical mounting and one that effectively eliminates the excessive rocking that is inherent to the three-point arrangement due to the better distribution of the cab load.

For transmitting power from the engine 12 to the rear axle (not shown) a gear-set 74 is mounted within the chassis frame, behind the engine and the usual clutch mechanism housing 75. This gear-set may be of any preferred type, that in the present instance providing for five forward speeds and reverse, and conforming generally to the structure of my co-pending application for Letters Patent filed December 22, 1932, Serial No. 648,330, which includes four shift-rods, each embodying a jaw engageable by the toe of a manually actuable shifting lever, the lever being bodily movable on its longitudinal axis to increase its range of lateral arcuate movement for conditioning the gear-set for functioning in the fifth forward speed and in reverse, this arrangement providing for a shift diagram which corresponds generally to that followed in the use of the standard gear-set.

Since the engine, as has been explained, is mounted within the area of the seat-box and the gear-set is to the rear thereof, I provide for conditioning the gear-set in its several speeds at a point remote therefrom, as from the driving compartment of the cab, with the shifting lever 85 located in its conventional position for convenient manipulation by the right hand of the operator occupying the seat 13, behind the steering wheel 8. To this end, the gear-set assembly includes an auxiliary shift rod engaging element 77, corresponding in function to the toe of the conventional shift lever, that is actuated into its various effective positions in response to complemental movements of the gear shifting lever 85, as hereinafter set forth. Similarly to its counterpart integral with the standard shift-lever, the aforesaid auxiliary toe 77 normally assumes an analagous position relatively to the shift-rod jaws, as it depends from its carrier rod 78, mounted for sliding and rotative movement in the housing bearings 79 and 80, in superposed relation and parallel to the plane in which the shift-rods having the usual fork connections to the slidable gears of the set are disposed. As will be noted, the rod 78 extends through the bearing 79 and carries a lever 81 terminating in a ball 81a seated in the socket 82 of the arm 83, which is fixed to the end of the shaft 84, the latter being housed within the tube 86 supported in a horizontal plane to the left of the engine and parallel to the crankcase wall thereof, for relative longitudinal and rotative movement. In the present embodiment, the tube 86, at its forward end, is retained within a sleeve 87 preferably integral with the bracket or fitting 88 which may be rigidly supported laterally of the front end of the engine or from one of the chassis frame members, the rear end of the tube being telescoped into the sleeve 89 entered in the front wall of the extension 74a of the gear-set housing, this extension forming a well within which the coacting lever 81 and arm 83 with the cooperating parts of their supporting media are enclosed, the sleeves 87 and 89 embodying, or embracing, bearing surfaces, as at 87a and 89a, within which the shaft 84 is movable relatively to its tubular housing, as aforesaid.

In the mounting of the gear-set, with its driven shaft in alinement with the engine crank-shaft, as in standard practice, the housing, including the upwardly and forwardly projecting extension 74a thereof, is canted to the left on its longitudinal axis through an arc of approximately 45°, to admit of the disposition of the shaft housing-tube 86 parallel to the engine, as explained, the portion 74c of the housing extension 74a, within which the tube-receiving sleeve 89 is located, being laterally offset in alinement with the bracket 88 to obtain the requisite clearance, whereby the auxiliary toe 77 may function in response to the sequential movements of the interconnected rod 78 and shaft 84 and the cooperating lever 81 and arm 83, as hereinafter described.

The manually actuable shifting lever 85, associated with the housing 90, corresponding in its general outlines to the conventional type of housing, and supported in advance of the front of the engine 12, as by a bracket 91 or other suitable fitting, fixed to the chassis frame is telescopically connected at its lower end to an arm or lever 93 which embodies a socket 94 for the reception of the ball end 102 of the lug 103 fixed to the end of the shaft 84 for movement therewith, as by tapering the mating surfaces of the lug and shaft and threading the nut 104 on the end of the latter in engagement with the face of the lug, the head end of the arm or lever 93 being offset relatively to the socket end thereof, as by the curvature of the intermediate portion, as shown. A shoulder 93a is formed contiguous to the head end of the arm or lever 93, the portion 93b, thereabove, of reduced diameter, being entered in and providing a bearing surface for the complemental socket end 85a of the shift lever 85, which is supported from said shoulder by the interposed spring 95, this interconnection of the two levers, 85 and 93, providing for their functioning as a unitary structure, in the fore and aft and lateral movements of the shift lever, while rendering the latter capable of longitudinal movement relatively to its supporting element, for the purposes which, hereinafter, will become apparent.

The aforesaid lever or arm 93, adjacent its lower end, is suitably mounted within the clevis or bifurcated end 96 of the fitting 97, for relative rotative movement, about the longitudinal axis of the connecting bolt 98, this fitting being entered in the bearing member 99 of the forward extension 100a of the bracket 100, for rotative movement on its longitudinal axis, the end of the stem or entering portion thereof being threaded to receive the retaining nut 101 cooperating with the washer 101a. The bracket 100 is adapted to be fixed, as by bolting to any appropriate support, as a chassis frame member or to the engine bed.

As will be seen from Figures 16 and 17, the housing 90, which is provided with an orifice 90a to accommodate the lever or arm 93 throughout its range of movement in intersecting arcs, embodies laterally extending ribs or ways 105 and 106 on its side walls to cooperate with the lateral projectings 107 and 108 on the shift lever 85, the rib 106 being undercut from end to end to form a groove or track within which the upturned end 108a of the shift lever projection 108 is adapted to travel when engaged therewith, in response to the depression of the lever in opposition to the spring 95 and its movement to the left on the fulcrum of the arm 93. Conversely, the movement of the shift lever to the right, while depressed, will cause the projection 107 thereof to ride beneath the housing rib 105, it being apparent that when the lever 85 is in its normal or spring supported position, as shown in Figure 16, the ribs or ways 105 and 106 function as stops to limit the lateral movement of the lever, the lever-carried projections 107 and 108 being disposed in the plane of the respective ribs with which they cooperate and riding therebetween. Obviously, any tendency to movement of the lever laterally beyond that defined by the stops, will be arrested as one or the other of the lever projections 107 and 108 abut thereagainst. The lever 85, in the full and dot and dash lines of Figure 17, is shown in its two extreme lateral positions, just described, with the cooperating projections and ribs engaged.

The shift rods of the gear-set, as disclosed in my aforesaid application are four in number and are adapted to be engaged by the auxiliary toe 77, the movements of which respond to those of the shift lever in the selection and actuation of the rods. Assuming that the gears for the first forward speed are to be engaged, the shift lever is canted to the left, the arm 93 moving coincidentally therewith on its fulcrum 98 to rock the shaft 84, through the interconnected ball and socket members 102 and 94, and enter the toe 77 in the jaw of the appropriate slide rod. The shift lever is then moved forwardly on the transverse axis provided by the fitting 97 to urge the shaft 84 rearwardly, this movement, of course, being transmitted through the arm 83 and lever 81 to the toe carrying rod 78 to shift the gear-set rod with which it has been engaged as previously described. For conditioning the gear set for functioning in its second speed ratio, the shift lever 85 is moved backward to effect the forward movement of the toe rod 77. For the third speed the movement of the shift lever is to the right and forward, the shaft 84 rocking to the left and sliding rearwardly in response to the lever movements, this clockwise movement of the shaft 84 being translated into an anti-clockwise movement of the toe rod to enter the toe 77 in the slide immediately to the left of the slide for engaging the first and second speed gears, it being obvious that the dependent toe 77 will have an arcuate movement to the left, while in picking up the slide for the aforesaid first and second speeds its movement will be to the right. Movement of the shift lever to its rear limits on the right, will urge the slide with which the toe 77 is engaged forwardly to mesh the gears for fourth speed. As will be readily seen, the relative movements of the shift lever and the auxiliary toe 77 correspond to those of the conventional shift lever and its integral toe; in other words, as the conventional lever is shifted or canted to the right, the toe thereof swings to the left and vice versa.

Now, when it is desired to condition the gear-set for operation in the fifth speed, the shift lever 85 is depressed against the spring 95 and pressed to the right to engage the lever projection 107 beneath the housing rib or way 105 which increases the radius of movement of the lever or arm 93 on its axis 98 and likewise increases the arcuate movement of the shaft 84 in a clockwise direction which is translated into an anti-clockwise movement of the toe-rod 78 to increase the swing of the toe for entering into the jaw of the slide at the extreme left, meshing of the gears being then effected by the backward movement of the shift lever on its axis 97, with a concurrent forward movement of the shaft 84 and the toe-rod 78. To return the shift lever to neutral, it is depressed sufficiently to permit the disengagement of the projection 107 from the housing rib 105, whereupon it may be returned to its normally spring supported position relatively to the head-end of the arm or lever 93. The movements of the shift lever for the meshing of the gears for the reverse drive are downward on its longitudinal axis to increase the arc of the anti-clockwise movement of the shaft 84, as the lever is canted to the left to bring the projection 108 thereof into engagement with the housing rib or way 106, the finger 108a of said projection riding in the groove of the way as the lever is shifted backwardly, the selecting movement of the shift lever through the medium of the interposed shaft 84 and the interconnected arm 83 rigid therewith and the lever 81 fixed to the toe-rod 78, being translated into an opposite radial movement of the toe 77 to enter the shift rod to the extreme right of the series for its actuation forwardly in response to the like directional movement of the shaft 84 and the toe-rod 78. It will be noted, especially from the showing of Figure 16, that the depth of the socket 94 and its internal contour in combination with the ball end of the lug 103 not only provide a universal joint between the lever and the shaft 84, but a connection that admits of the requisite relative axial adjustment of the lever, without resulting in lost motion between the parts. The interconnection of the arm 83 and the lever 81 of the toe-rod 78 also permits these members to have the range of radial movement that is essential to conform to the increase in the degree of the lateral movements of the shift lever.

From the foregoing, it will be manifest that I have provided a system for actuating the gear shifting elements of a gear-set at a point remote therefrom, wherein the movements of the shifting lever, selective and actuating, conform to those of the shift lever of the conventional type, the mechanism that I employ for transmitting the effort to the work, including means whereby there is a translation of the leverage force applied into a counter force for the performance of the work, the structure employed being simple and extremely practical in its assembly and the manner in which it functions. By the use of this system, I am enabled to utilize to the utmost the advantages, as already pointed out, that reside in the location of the engine beneath the seat. All of the controls are in front, or forward, of the engine and in those locations that conform to standard practice and design, so that one versed in the handling of a vehicle of the conventional type, may operate a vehicle in which my invention is embodied without difficulty and, in fact, with greater comfort and safety for the reasons hereinbefore set forth.

Another important factor in locating the engine beneath the seat is the shortened wheel-base that it makes possible, with a better distribution of the axle load and a coincidental increase in the pay-load space. For example, a truck of the conventional design, with the engine in advance of the cab, having a gross weight of 24,000 lbs., and a wheel-base of 184 inches carries 75% of the load on the rear axle while 25% is borne by the front axle, the vehicle having a seventy foot turning circle, whereas one conforming to the present invention having a gross weight of 27,000 lbs. has a wheel-base of only 128 inches and carries 18,000 lbs. on the rear axle and the remainder of the weight upon the front one, the latter vehicle having an overall length of approximately 19 feet compared to the 23 foot length of the former. Yet, notwithstanding this decrease in the dimensions of a truck responding to my invention, it embodies space for a larger pay-load and this combined with a turning circle of forty-five feet, makes it an ideal type of vehicle for operation in congested districts or in cities having narrow streets, while due to its load capacity it is equally satisfactory and economical for long-distance haulage.

In order to obtain the distinctive features just referred to, in addition to mounting the engine within the area of the seat-box and utilizing the other structural factors that contribute to the attainment of my objectives generally, I provide for the location of the front axle under the cab slightly forward of the transverse axis of the engine, as will be apparent from the disposition of the fender well 110 in the side of the cab, as shown in Figure 10. To conform to this change in the location of the front axle, without relocating the steering wheel and changing its angle of inclination from the standard, the steering arm and interconnected drag link and tie rod have their positions reversed, the cooperating elements of the steering gear layout being so dimensioned that the vehicle may be handled with greater facility than one of the conventional design.

While, as previously stated, I have described my invention as it may be applied to or embodied in a truck, it will be entirely clear that it may also be advantageously utilized in the construction and operation of numerous other types of vehicles, as tractors, omnibusses and also in what are commonly termed passenger cars, which, with the present trends to new design may conform to my invention. Also, it will be understood that various changes in the arrangement of the structural elements entering into my invention and in the elements themselves may be effected, within the spirit and scope of this invention, it being obvious, of course, that the system of remote control for the transmission is applicable to marine and aircraft as well as to the divers types of road operated vehicles, wherein it is especially valuable in the advancement of the utility of such vehicles.

I claim:

1. A motor vehicle having a cab enclosing a driving compartment, a cowling at the forward end of said cab and in advance of said driving compartment, means associated with said cowling and cooperating therewith to form a chamber insulated from said driving compartment, a radiator mounted within said chamber, a seat-box, an internal combustion engine mounted to locate the upper part of the cylinder block and engine head within the area of the seat-box, the top of the seat box being vertically spaced from the engine head, means for insulating the engine exhaust manifold located within the space between said head and the top of said seat-box, a fan associated with said radiator, means for driving said fan from the front end of said engine, a gear-set behind said engine for transmitting power therefrom, a duct for transferring cool air from said fan to said engine and distributing it thereover, and manually actuatable means in advance of said seat-box for conditioning said gear-set for functioning in transmitting power, as aforesaid.

2. A vehicle embodying an enclosed driving compartment, a seat and a cooperating back-rest for the vehicle operator, said back-rest being hinged to a portion of said compartment for arcuate movement, means for supporting said seat in its normally functioning position, said means including a seat-box, a seat-pan comprising relatively movable sections hinged at one end to said compartment, a support for said seat-pan adapted to span said seat-box, hinged to said compartment and devices associated with relatively spaced portions of said compartment formed for engagement with the aforesaid hinged elements to retain them respectively in positions to which they are adjustable on their hinged connections, to afford unobstructed access to the area defined by the inner walls of said seat-box, the seat-pan sections being foldable upon themselves for retention in adjusted position.

3. In a motor-vehicle embodying a cab, a seat-box enclosed thereby, an engine mounted within the area of said seat-box, a seat-pan support hinged to the rear wall of said cab and adapted to normally span said seat-box, a seat-pan composed of a plurality of sections connected for relative movement hinged at one end to the rear wall of said cab, said pan normally being locatable in said support, to carry a seat bodily removable therefrom, a back-rest formed to cooperate with a seat when positioned on said seat-pan, said back-rest having a hinge connection with a part of the cab, said pan forming the top of said seat-box and being vertically spaced from the head of said engine, and a plurality of devices associated with said cab adapted to function to retain said hinged elements in positions to which they may be respectively adjusted relatively to the rear wall of the cab, to uncover and afford unobstructed access to the area defined by the inner walls of said seat-box and to the engine located therewithin.

4. In a motor-vehicle embodying a cab, a seat-box enclosed thereby, an engine mounted within the area of said seat-box and means for supporting a seat over said engine in spaced relation to the head thereof, said means including an insulated seat pan spanning said seat-box, one end of said pan being hinged to the rear wall of said cab, a device associated with a part of the cab adapted for engagement with said pan, when the latter is actuated to a raised position to uncover said engine to retain said pan in such position, to afford unobstructed access to said engine and the area within said seat-box, and an insulated cover for the inlet and exhaust manifolds of said engine removably fastened thereto.

5. A motor-vehicle having a cab, including a cowling at its forward end, a dash-board and means associated therewith cooperating with said cowling to form a chamber, a radiator mounted within said chamber, a fan supported in juxtaposition to said radiator, a driving compartment defined by said dash-board, the rear wall of the cab, floor-boards and the top of the cab, said chamber functioning to insulate said driving compartment from said radiator, a seat-box at the rear of said driving compartment, a seat-pan supported therefrom, an internal combustion engine supported from said vehicle to locate the upper part of its cylinder block and the associated head within the area of said seat-box, means for transferring air from said fan to said engine, said means spanning said driving compartment, means beneath said floor boards for driving said fan from said engine and means disposed between said seat-pan and said engine head insulatingly enclosing the engine exhaust manifold, said chamber, said seat-pan and said manifold insulating means conjointly functioning to prevent the emission of heat into said driving compartment from the power-plant.

6. A motor-vehicle having a cab, including a cowling at its forward end, a dash-board and means associated therewith cooperating with said cowling to form a chamber, engine cooling means located within said chamber, a driving compartment defined by said dash-board, the rear-wall of the cab, floor-boards and the top of the cab, said chamber functioning to insulate said driving compartment from said engine cooling means, a seat-box at the rear of said driving compartment, a seat-pan supported therefrom, an internal combustion engine mounted in said vehicle to locate the upper end of its cylinder block and the associated head within the area of said seat-box, means for transferring a cooling agent from said chamber to said engine, said means spanning said driving compartment, and means disposed between said seat-pan and said engine head insulatingly enclosing the engine exhaust manifold, said chamber, said seat-pan and said manifold insulating means conjointly functioning to prevent the emission of heat into said driving compartment from the power plant.

BENJAMIN B. BACHMAN.